(12) United States Patent
Balasubramanian et al.

(10) Patent No.: US 12,693,143 B2
(45) Date of Patent: Jul. 28, 2026

(54) SYSTEM FOR MONITORING FLOW OF FLUID THROUGH A PIPELINE

(71) Applicant: INDIAN INSTITUTE OF TECHNOLOGY MADRAS (IIT MADRAS), Chennai (IN)

(72) Inventors: Krishnan Balasubramanian, Chennai (IN); Nishanth R., Chennai (IN)

(73) Assignee: INDIAN INSTITUTE OF TECHNOLOGY MADRAS (IIT MADRAS), Chennai (IN)

( * ) Notice: Subject to any disclaimer, the term of this patent is extended or adjusted under 35 U.S.C. 154(b) by 799 days.

(21) Appl. No.: 18/016,654

(22) PCT Filed: Jul. 16, 2021

(86) PCT No.: PCT/IN2021/050686
§ 371 (c)(1),
(2) Date: Jan. 17, 2023

(87) PCT Pub. No.: WO2022/013893
PCT Pub. Date: Jan. 20, 2022

(65) Prior Publication Data
US 2023/0288236 A1 Sep. 14, 2023

(30) Foreign Application Priority Data
Jul. 17, 2020 (IN) .............................. 202041030506

(51) Int. Cl.
*G01F 1/66* (2022.01)
*G01F 1/667* (2022.01)

(52) U.S. Cl.
CPC .............. *G01F 1/662* (2013.01); *G01F 1/667* (2013.01)

(58) Field of Classification Search
None
See application file for complete search history.

(56) References Cited

U.S. PATENT DOCUMENTS 4,524,610 A * 6/1985 Fitzgerald ............ G01N 11/167
73/54.24
5,280,728 A * 1/1994 Sato ........................ G01F 1/662
73/861.28

(Continued)

OTHER PUBLICATIONS

Kwun et al., "Magnetostrictive generation and detection of longitudinal, torsional, and flexural waves in a steel rod," The Journal of the Acoustical Society of America, vol. 96, No. 2, Aug. 1994, pp. 1202-1204.

(Continued)

*Primary Examiner* — Richard Isla
(74) *Attorney, Agent, or Firm* — Foley & Lardner LLP

(57) ABSTRACT

A system for monitoring flow of fluid through a pipeline is disclosed. The system includes a ferromagnetic strip mounted on an outer surface of the pipeline. A solenoid coil is wound around the ferromagnetic strip and is connectable to a power source. A plurality of magnets is positioned over the solenoid coil, wherein each of the plurality of magnets are positioned at a pre-defined orientation with respect to longitudinal axis of the pipeline. A processing unit is communicatively coupled to the solenoid coil. The processing unit generates a plurality of wave modes in the pipeline by supplying power to the solenoid coil in concurrence with the plurality of magnets and the ferromagnetic strip. The processing unit is configured to receive a plurality of wave signals reflected and are then compared with pre-defined wave signals by the processing unit to monitor flow of fluid through the pipeline.

20 Claims, 5 Drawing Sheets

(56)         References Cited

U.S. PATENT DOCUMENTS

| | | | |
|---|---|---|---|
| 6,396,262 B2 | | 5/2002 | Light et al. |
| 6,829,948 B2 * | 12/2004 | Nakabayashi .......... G01F 1/667 |
| | | | 73/861.74 |
| 8,141,434 B2 * | 3/2012 | Kippersund ............ G01F 1/662 |
| | | | 73/861.28 |
| 8,567,259 B1 * | 10/2013 | Ballard ................. G01F 1/3209 |
| | | | 356/28 |
| 8,907,665 B2 * | 12/2014 | Rose .................... G01N 29/262 |
| | | | 324/228 |
| 10,852,171 B2 * | 12/2020 | Ploss ........................ G01F 1/667 |
| 10,876,871 B2 * | 12/2020 | Head ........................ G01F 1/662 |
| 11,408,758 B2 * | 8/2022 | Garoon ................... G01F 1/667 |

OTHER PUBLICATIONS

International Searching Authority, "International Search Report," issued in connection with International Patent Application No. PCT/IN2021/050686, dated Oct. 22, 2021.

International Searching Authority, "Written Opinion," issued in connection with International Patent Application No. PCT/IN2021/050686, dated Oct. 22, 2021.

* cited by examiner

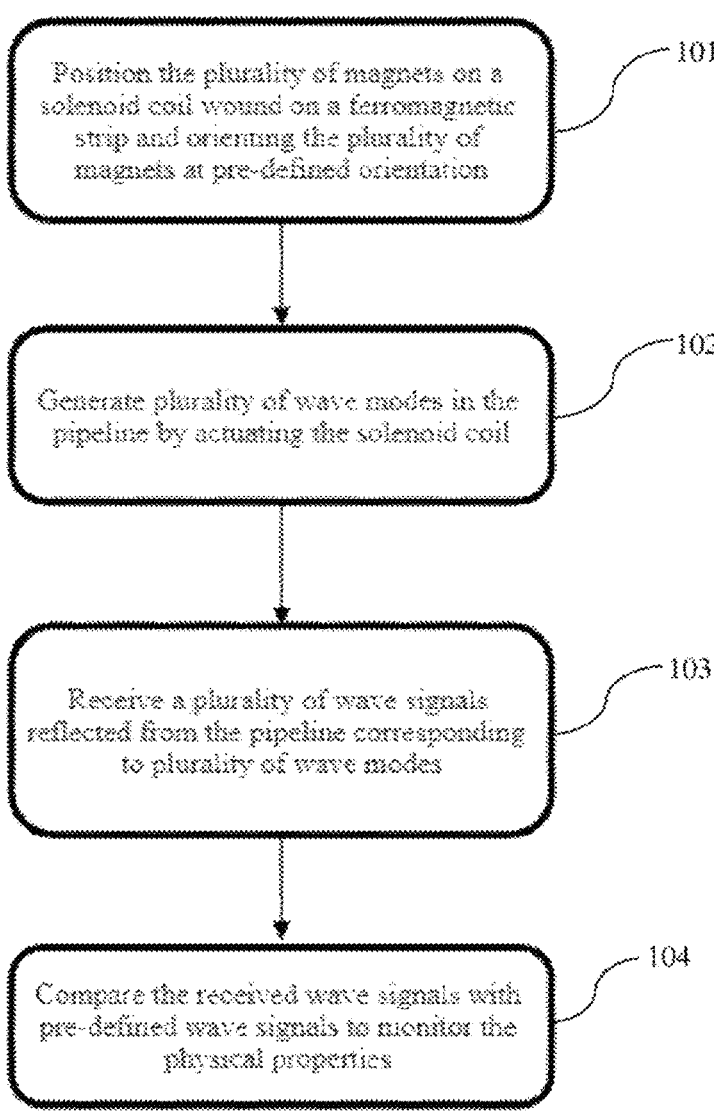

Position the plurality of magnets on a
solenoid coil wound on a ferromagnetic
strip and orienting the plurality of
magnets at pre-defined orientation — 101

Generate plurality of wave modes in the
pipeline by actuating the solenoid coil — 102

Receive a plurality of wave signals
reflected from the pipeline corresponding
to plurality of wave modes — 103

Compare the received wave signals with
pre-defined wave signals to monitor the
physical properties — 104

FIG.2

SYSTEM FOR MONITORING FLOW OF FLUID THROUGH A PIPELINE

CROSS-REFERENCE TO RELATED APPLICATIONS

The present application claims priority under 35 U.S.C. § 371 to International Patent Application No. PCT/IN2021/050686, filed Jul. 16, 2021, which claims priority to and the benefit of Indian Patent Application No. 202041030506, filed on Jul. 17, 2020. The contents of these applications are hereby incorporated by reference in their entireties.

TECHNICAL FIELD

The present disclosure relates to the field of flow monitoring. Particularly, but not exclusively, the present disclosure relates to a system and method for monitoring the fluid flowing in a pipeline. Further embodiments of the present disclosure disclose system and method for monitoring the flow of fluid through the pipeline by determining physical properties of the fluid flowing through the pipeline.

BACKGROUND OF THE DISCLOSURE

Generally, fluids are substances which can flow. Technically the flow of any substance means a continuous relative motion between different particles of the substance. The term fluid includes both liquids and gases. The main difference between a liquid and a gas is that the volume of a liquid remains definite because it takes the shape of the surface on or in which it comes into contact, whereas a gas occupies the complete space available in the container in which it is kept. The liquids or gases flowing through pipes or ducts is commonly used in heating and cooling applications and fluid distribution networks. The fluid in such applications is usually forced to flow by a fan or pump through a flow section. For example, water in a city is distributed by extensive piping networks. Oil and natural gas are transported hundreds of miles by large pipelines. The cooling water in an engine is transported by hoses to the pipes in the radiator where it is cooled as it flows. In most of the cases, pipe condition monitoring, flow condition monitoring and flow assurance on time to time basis would form an important role to ensure that the flow within the pipe is at an ideal condition. By way of example, but not by way of limitation, in oilfield production systems, particularly sub-sea systems with long tiebacks hydrocarbon transportation pipelines are used. In such production systems and pipelines, various scale depositions may occur in part or all of the pipeline, production conduits and/or the like during the life of a production well or a transportation pipeline. These scale deposits may be a principle cause of flow assurance problems. Hence, it is necessary to continuously monitor the flow of the fluids within the pipelines.

There are flowmeters which are clamped externally onto pipes to measure flow occurring within the pipes in a non-invasive technique. Certain flowmeters use an ultrasound signal to monitor single-phase flow in industrial pipes. However, these meters are limited in application as they cannot be used to monitor multi-phase flow of gas/liquid or gas/oil/water in metal pipes, which are common in the oil industry. This is because the metal pipes cause unwanted reflection of the ultrasound signal and also gas bubbles in the fluid tend to attenuate and scatter the signal. This makes interpretation of a reflected ultrasound signal very difficult.

There are other known commercially available multi-phase flowmeters which measure flow rates by using a combination of measurement techniques, such as Venturi, positive displacement, gamma-ray, X-ray, microwave and electrical impedance. These meters, however, are all in-line types which need to be placed inside the well tubular or, at least, need a window into the tubular to perform the measurements. However, provision of multi-phase flow meters in-line with the fluid flow do not serve the purpose of accurate monitoring and measurement of fluid flow within the pipelines.

The present disclosure is directed to overcome one or more limitations stated above or other such limitations associated with the conventional systems.

The information disclosed in this background of the disclosure section is only for enhancement of understanding of the general background of the invention and should not be taken as an acknowledgement or any form of suggestion that this information forms the prior art already known to a person skilled in the art.

SUMMARY OF THE DISCLOSURE

One or more shortcomings of the conventional method and system are overcome by the method and the system as claimed and additional advantages are provided through the provision of system as claimed in the present disclosure.

Additional features and advantages are realized through the techniques of the present disclosure. Other embodiments and aspects of the disclosure are described in detail herein and are considered a part of the claimed disclosure.

In one non-limiting embodiment of the disclosure, a system for monitoring flow of fluid through a pipeline is disclosed. The system includes a ferromagnetic strip mounted on an outer surface of the pipeline, at one or more pre-determined locations. A solenoid coil is wound around the ferromagnetic strip and is connectable to a power source. A plurality of magnets is positioned over the solenoid coil, wherein each of the plurality of magnets are positioned at a pre-defined orientation with respect to longitudinal axis of the pipeline. A processing unit is communicatively coupled to the solenoid coil. The processing unit is configured to generate a plurality of wave modes simultaneously in the pipeline by supplying power to the solenoid coil in concurrence with the plurality of magnets and the ferromagnetic strip. Further, the processing unit is configured to receive a plurality of wave signals reflected from the pipeline corresponding to the plurality of wave modes. The received wave signals are then compared with pre-defined wave signals by the processing unit to monitor the flow of fluid through the pipeline.

In an embodiment of the disclosure, the power source supplies power through the solenoid coil and the solenoid coil in concurrence with the plurality of magnets and ferromagnetic strip generates plurality of wave modes simultaneously in the pipeline.

In an embodiment of the disclosure, wherein the processing unit is configured to determine physical properties of the fluid including viscosity, density, temperature and flowrate based on the comparison of the received wave signals with pre-defined wave signals. Also, the processing unit is configured to determine corrosion and sediment deposition in the pipeline.

In an embodiment of the disclosure, the ferromagnetic strip is made of at least one of iron, cobalt and nickel. The solenoid coil is made of copper.

In an embodiment of the disclosure, the pre-defined orientation of the plurality of magnets with respect to longitudinal axis of the pipeline ranges from 30° to 60°.

In an embodiment of the disclosure, the plurality of wave modes are generated simultaneously, and the plurality of wave modes include torsional wave mode, flexural wave mode and longitudinal wave mode.

In an embodiment of the disclosure, the torsional wave mode, flexural wave mode and the longitudinal wave mode are generated by orienting the plurality of magnets at 45° with respect to longitudinal axis of the pipeline.

In an embodiment of the disclosure, at least one of longitudinal wave mode along with flexural wave mode and torsional wave mode along with flexural wave mode is generated at the pre-defined orientation between 30° to 60° excluding 45°.

In an embodiment of the disclosure, the system comprises an oscilloscope configured to display the plurality of received wave signals and the pre-defined wave signals. The oscilloscope determines time of flight data and amplitude ratio of the plurality of received wave signals with respect to the pre-defined wave signals.

In an embodiment of the disclosure, the processing unit determines the physical properties of the fluid within the pipeline based on the tie of flight data and amplitude ratio.

In another embodiment of the disclosure, a method of monitoring flow of fluid through a pipeline is disclosed. The method includes positioning a plurality of magnets on a solenoid coil wound on a ferromagnetic strip and orienting the plurality of magnets at a pre-defined orientation with respect to longitudinal axis of the pipeline. A processing unit generates a plurality of wave modes simultaneously in the pipeline by supplying power to the solenoid coil in concurrence with the plurality of magnets and the ferromagnetic strip. The processing unit receives a plurality of wave signals reflected from the pipeline corresponding to the plurality of wave modes. The processing unit then compares the received wave signals with pre-defined wave signals to monitor the flow of fluid through the pipeline.

In an embodiment of the disclosure, the method comprises detection of deposition of at least one of wax coating and sediment deposition within the pipeline and an outer surface of the pipeline based on the amplitude ratio It is to be understood that the aspects and embodiments of the disclosure described above may be used in any combination with each other. Several of the aspects and embodiments may be combined to form a further embodiment of the disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING FIGURES

The novel features and characteristic of the disclosure are set forth in the appended claims. The disclosure itself, however, as well as a preferred mode of use, further objectives and advantages thereof, will best be understood by reference to the following detailed description of an illustrative embodiments when read in conjunction with the accompanying figures. One or more embodiments are now described, by way of example only, with reference to the accompanying figures wherein like reference numerals represent like elements and in which:

FIG. 2 illustrates a flowchart for a method of monitoring flow of fluid through a pipeline, in accordance with an embodiment of the present disclosure.

Figure 1:
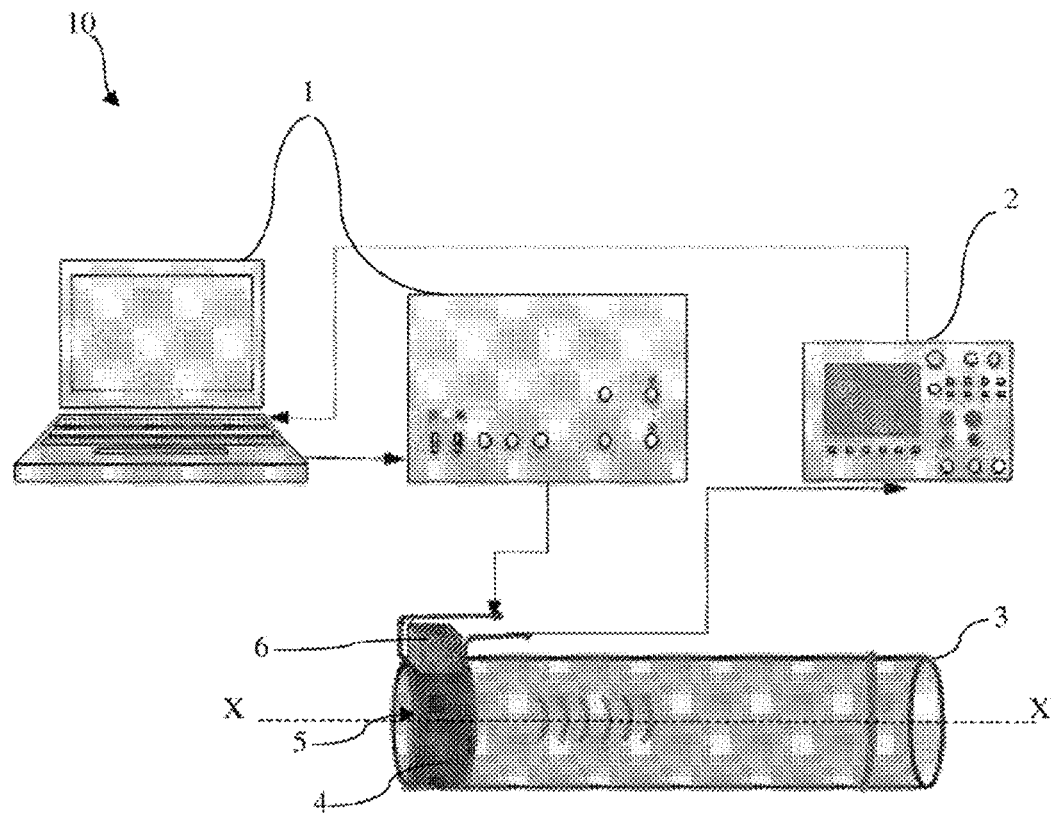
FIG. 1 illustrates schematic view of a system used for monitoring flow of fluid through a pipeline, in accordance with an embodiment of the present disclosure.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent processes do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Embodiments of the present disclosure discloses a system for monitoring flow of fluid through a pipeline, wherein such pipeline may be employed in oil industries. However, the application of the system should not be construed as limitation as the system may be used in applications other than oil industries. The system may be configured to determine physical properties of the fluids and deposition of sediments in the pipeline. In an embodiment, the physical properties of the fluid include density, viscosity, temperature, flowrate etc. The above-mentioned physical properties should not be in anyway considered or construed as a limitation for the scope of the system of the present disclosure. The system may also detect corrosion that may occur due to multiple factors in the pipeline, for example, in the oil pipelines the corrosion may occur due to sand. With the system of the present disclosure sediment depositions may also be detected with ease. The system also helps in timely detection or continuous monitoring of the flow characteristics and determine the physical properties of the fluid so that maintenance operations can be performed even before the pipeline fails. The system when employed in the industries where fluid transportation within pipelines are necessary does not hinder the flow of fluid, and thus avoid downsides that may be caused in the pipeline that may affect production rates. Further, the system ensures that the operating efficiency of the pipeline is not hindered.

According to various embodiments of the present disclosure, the system includes a ferromagnetic strip that may be mounted on an outer surface of the pipeline. The ferromagnetic strip may be positioned at one or more pre-determined locations on the outer circumference of the pipeline. In some embodiments, a solenoid coil may be positioned over the ferromagnetic strip. The solenoid coil may be twined or wound over the ferromagnetic strip and defined with two ends. The solenoid coil may be configured to be connectable to a power source. The power source may be configured to supply power to the solenoid coil during the operation. The power source may be an external component or component within the system. In an embodiment, a plurality of magnets may be positioned over the solenoid coil. The plurality of magnets may be oriented at a pre-defined orientation with respect to longitudinal axis of the pipeline. The solenoid coil in concurrence with the ferromagnetic strip and the plurality of magnets may act as a magneto-strictive transceiver which can transduce plurality of mechanical waves and receive a plurality of reflected wave signal corresponding to the plurality of mechanical waves. The mechanical waves produced by the magneto-strictive transceiver may be acoustic waves. When the power is supplied to the solenoid coil, the solenoid coil in concurrence with the ferromagnetic strip and the plurality of magnets produce vibration in the ferromagnetic strip and generates mechanical waves in the pipeline.

Further, the plurality of reflected wave signals are received by magneto-strictive transceiver and is transmitted to the processing unit. The plurality of reflected wave signals may be recorded and displayed through an oscilloscope. The plurality of wave signals may then be compared with a pre-defined wave signals stored in the processing unit which enables the monitoring of the fluid flowing within the pipeline. In an embodiment, change in time of flight data (TOF) and amplitude ratio of the plurality of received wave signals with respect to the pre-defined wave signals may be determined by the oscilloscope. Further, the change in TOF data and the amplitude ratio may be used by the processing unit to determine the physical properties of the fluid within the pipeline, and for determining corrosion and sediment deposits in the pipeline.

The terms "comprises", "comprising", or any other variations thereof used in the specification, are intended to cover a non-exclusive inclusion, such that system that comprises a list of components or steps does not include only those components or steps but may include other components or steps not expressly listed or inherent to such setup or method. In other words, one or more elements in an assembly proceeded by "comprises . . . a" does not, without more constraints, preclude the existence of other elements or additional elements in the assembly.

Henceforth, the present disclosure is explained with the help of one or more figures of exemplary embodiments. However, such exemplary embodiments should not be construed as limitation of the present disclosure.

The following paragraphs describe the present disclosure with reference to FIGS. 1 to 4. In the figures, the same element or elements which have similar functions are indicated by the same reference signs.

FIG. 1 is a schematic view of a system (10) used for monitoring flow of fluid through a pipeline (3). In some embodiments, the system (10) may be used to determine physical properties of fluid flowing through the pipeline (3). The system (10) may be mounted over the pipeline (3) which are employed for the purpose of transportation of fluids in industries such as but not limiting to oil and gas industries. In some embodiments, the cross-section of the pipeline (3) may be at least one of but not limiting it to a circular, an oval, a rectangular or a square cross section. In an embodiment, the system (10) may be configured to determine physical properties of the fluid flowing through the pipeline (3). In some embodiments, continuously monitoring the flow of fluid through the pipeline (3) enables timely detection of change in fluid properties and take necessary action. Also, the system (10) ensures timely detection of sediments in the pipeline (3), thereby avoiding potential losses which may be caused over period of time.

Further, the system (10) is also configured to determine the presence of corrosion in the pipeline (3). In an embodiment, the system (10) includes a ferromagnetic strip (5). The ferromagnetic strip (5) may be mounted on an outer surface of the pipeline (3). In some embodiments, the ferromagnetic strip (5) may be wound on the outer circumference of the pipeline (3). The ferromagnetic strip (5) may be connected or wound at pre-determined location of the pipeline (3). In an embodiment, the ferromagnetic strip (5) is made of at least one of iron, cobalt and nickel. However, the material used for ferromagnetic strip (5) should not be construed as a limitation of the present disclosure, any material that may be suitable for the purpose can be used as ferromagnetic strip (5). The ferro magnetic strip (5) may be wound at one or more pre-determined locations on the outer circumference of the pipeline (3).

Further, the system (10) includes a solenoid coil (4). The solenoid coil (4) may be wound around the ferromagnetic strip (5). In an embodiment, the solenoid coil (4) may be made of copper wire but not limiting to this particular material. The solenoid coil (4) may be defined with two free ends. The two free ends of the solenoid coil (4) may be configured to connectable to at least one of a processing unit (1) and a power source [not shown]. In an embodiment, the power source may be an external power source or an embedded power source. The power source may be configured to supply alternating current (AC) through the solenoid coil (4). In another embodiment, the system (10) may include a plurality of magnets (6). The plurality of magnets (6) may be positioned over the solenoid coil (4). Each of the plurality of magnets (6) may be positioned over the pipeline (3) with respect to a longitudinal axis (X-X) of the pipeline (3). In some embodiments, each of the plurality of magnets (6) may be oriented with a pre-defined orientation with respect to the longitudinal axis (X-X) of the pipeline (3). In another embodiment, the predefined orientation of the pipeline (3) may be ranging from 30° to 60° with respect to the longitudinal axis (X-X) of the pipeline (3). In an embodiment, upon supplying power to the solenoid coil (4), the solenoid coil (4) in concurrence with the ferromagnetic strip (5) and the plurality of magnets (6) may generate a plurality of wave modes in the pipeline (3) with fluid flowing in it. The plurality of wave modes may be generated simultaneously. In an embodiment, the plurality of wave modes include torsional wave mode, flexural wave mode and longitudinal wave mode.

A processing unit (1) may be communicatively coupled to the solenoid coil (4). The processing unit (1) may be configured to control the power supplied to the solenoid coil (4) through the power source, such that the solenoid coil (4) in concurrence with the ferromagnetic strip (5) and the plurality of magnets (6) generate a plurality of wave modes. Further, the processing unit (1) may be communicatively connected to an oscilloscope (2). The oscilloscope (2) may be configured to display the plurality of reflected wave signals received from the pipeline (3). In some embodiments, the oscilloscope (2) may be configured to determine a time of flight (TOF) data and an amplitude ratio of the plurality of reflected wave signals. In another embodiment, the processing unit (1) may be configured to determine one or more physical properties of the fluid flowing through the pipeline (3) based on the TOF data and the amplitude ratio.

In an exemplary embodiment, the system (10) may include memory unit associated with the processing unit (1). The memory unit is configured to store pre-defined wave signals, wherein the pre-defined wave signals are ideal wave signals that may be obtained by conducting a test using the system (10) on an ideal fluid flowing through the ideal pipe. The properties of the ideal fluid may be initially determined using the system (10) and such values may be stored in the memory unit of the system (10).

Figures 3, 4:
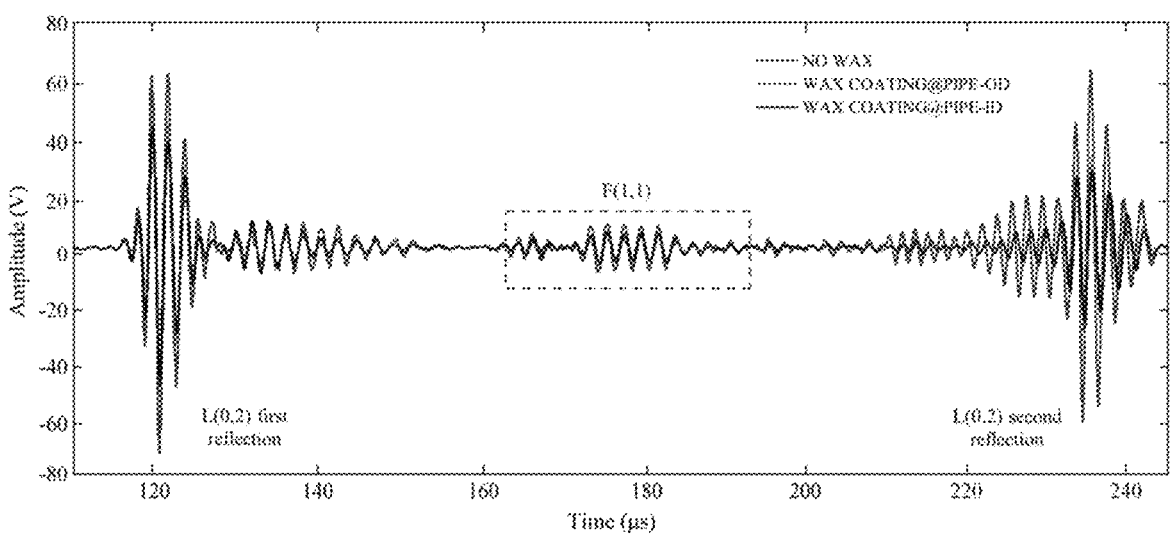
FIG. 3 illustrates an exemplary graph of reflected wave signals, in accordance with an embodiment of the present disclosure.
FIG. 4 illustrates a schematic representation of the system of FIG. 1 with power supplied from the power source, in accordance with the embodiment of the present disclosure.

To calibrate the performance of the system, and exemplary experiment has been conducted. In the experiment the pipeline (3) was wax coated and an iteration of the test for ideal fluid flow was performed. The wave signals received for the ideal fluid flow without wax coating the pipeline (3) and with wax coating the pipeline (3) may be displayed in the oscilloscope (2). As seen in FIG. 3, the oscilloscope (2) may display the wave signal corresponding to the ideal fluid flowing in the pipeline (3) and the wave signal corresponding to the flow of fluid in the wax coated pipeline. It can be observed that the wave signal frequency in the pipeline (3) may be higher than that of the frequency of the wave signal obtained by wave signals corresponding to the wax coated pipeline (3). The said change in signal frequency in the pipeline (3) may indicate that due to the deposition of wax in pipeline (3) or any such deposition in the pipeline (3) may affect the flow of fluid in the pipeline (3).

Referring now to FIG. 2, it is an exemplary embodiment of the present disclosure, illustrating a flowchart for a method of monitoring flow of fluid through the pipeline (3).

As illustrated in FIG. 2, the method comprises one or more blocks illustrating the method of monitoring flow of fluid through the pipeline (3). The method may be described in the general context of computer-executable instructions. Generally, computer-executable instructions can include routines, programs, objects, components, data structures, procedures, modules, and functions, which perform functions or implement abstract data types.

The order in which the method is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

Figure 6A:
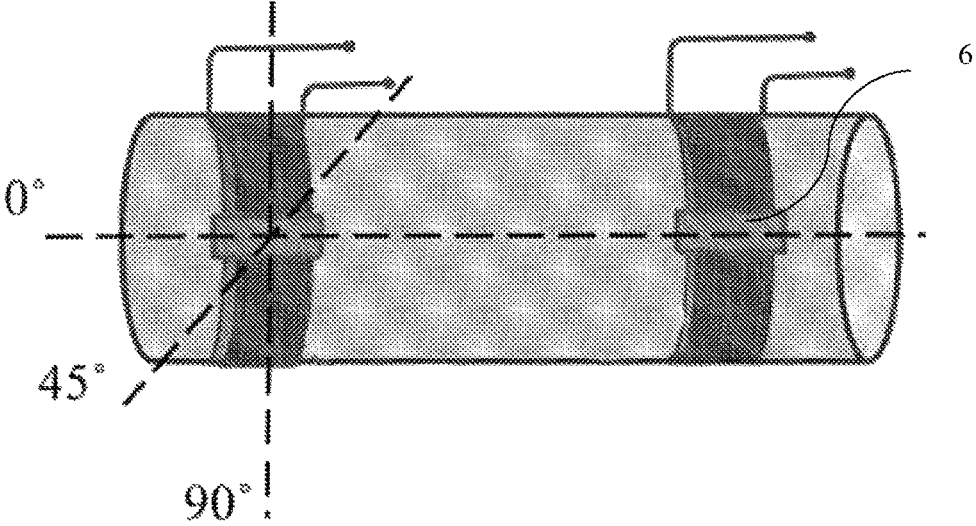
FIG. 6A to FIG. 6C illustrates a schematic representation of the system of FIG. 1 with magnets oriented in pre-defined positions, in accordance with the embodiments of the present disclosure.
Figure 6B:
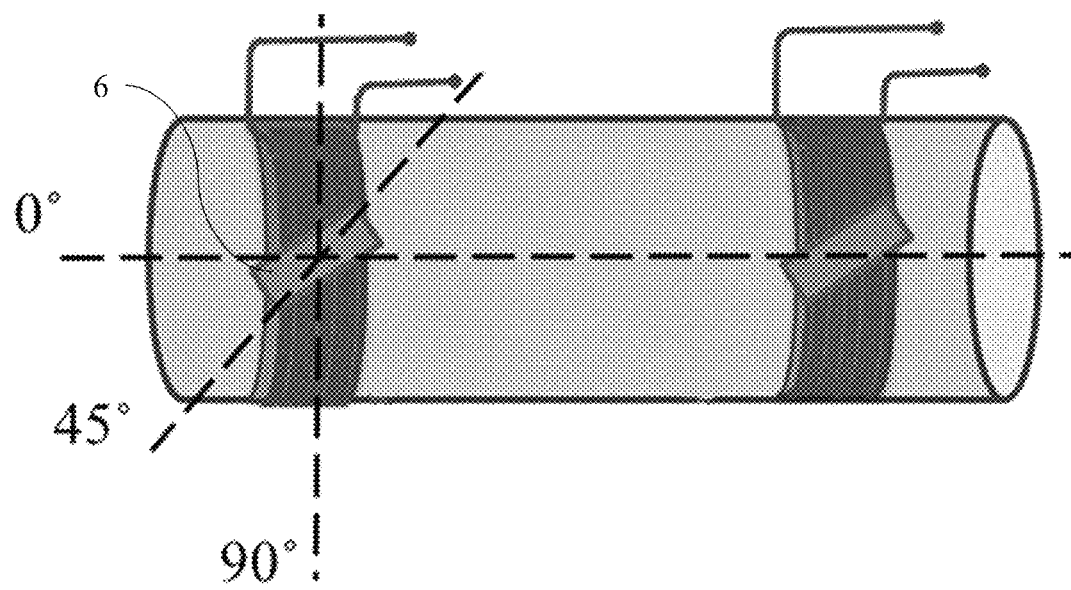
Figure 6C:
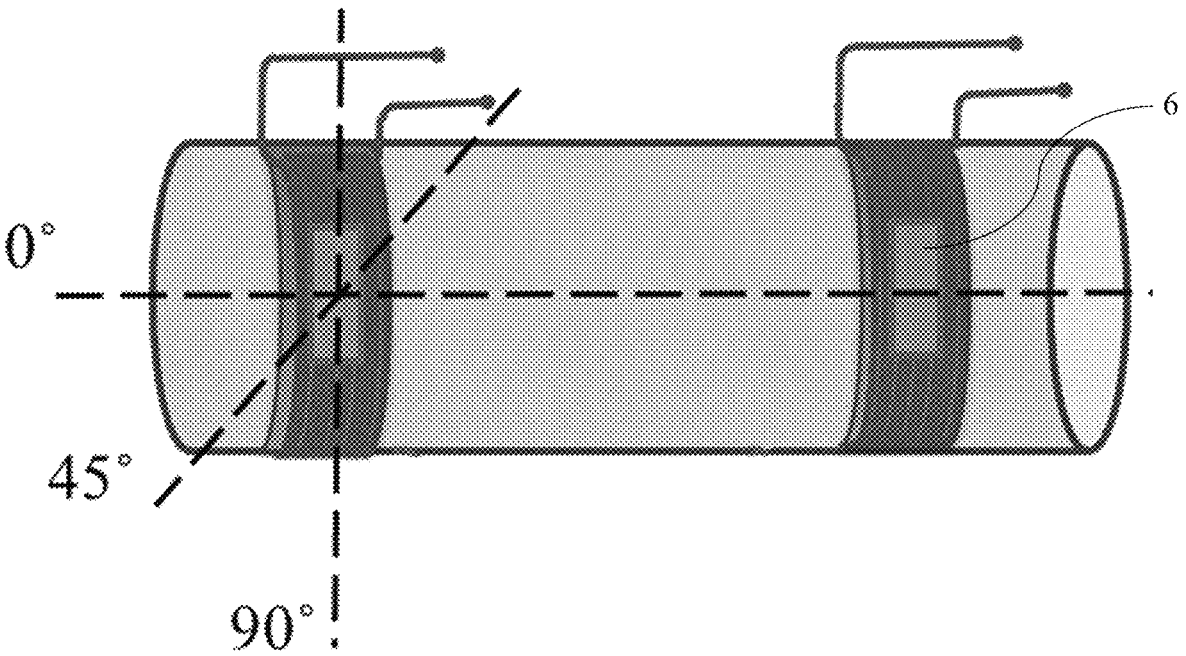

As shown at block 101, the plurality of magnets (6) may be positioned over the solenoid coil (4) which may be wound on a ferromagnetic strip (5). The ferromagnetic strip (5) may be positioned at one or more pre-determined locations on the pipeline (3). Each of the plurality of magnets (6) may be positioned over the pipeline (3) at the pre-determined orientation. The pre-determined orientation of the plurality of magnets (6) may be measured with respect to the longitudinal axis (X-X) of the pipeline (3). The pre-determined orientation of the plurality of magnets (6) ranges from 30° to 60° with respect to the longitudinal axis of the pipeline (3). Orienting each of the plurality of magnets (6) at each of the pre-determined orientation may generate the combination of one or more wave modes or plurality of wave modes in the pipeline (3) with fluid flowing in it. Table-1 below indicates the plurality of wave modes that may be generated by orienting each of the plurality of magnets (6) at pre-defined orientations [as shown in FIG. 6A to FIG. 6B]. In the below Table-1, the term "L" corresponds to longitudinal wave mode, "T" corresponds to torsional wave mode and "F" corresponds to flexural wave mode.

TABLE-1

| Orientation of the plurality of magnets along with the application for the pre-defined orientation. | | |
|---|---|---|
| Orientation of magnet in MSS | Wave mode | Application |
| 0° | L(0, 1) | Temperature monitoring, corrosion monitoring, Flow measurement (Dispersive frequency) |
| 90° | T(0, 1) | Temperature monitoring, Defect Detection, sediment deposition and wax coating detection |
| 45° | L(0, 1), T(0, 1) & F(1, 1) | Temperature monitoring (L(0, 1)), corrosion monitoring (T(0, 1)), Flow measurement (F(1, 1)), sediment deposition and wax coating (F(1, 1)) |
| 30°-60° | L(0, 1) & F(1, 1) or T(0, 1) & F(1, 1) | Temperature monitoring (L(0, 1)/T(0, 1)), corrosion monitoring (L(0, 1)/T(0, 1)), Flow measurement (F(1, 1)), sediment deposition and wax coating (F(1, 1)) |

As shown at block 102, the power source may be actuated by the processing unit (1) to supply power to the solenoid coil (4). In an embodiment, the power source supplies alternating current (AC) to the solenoid coil (4). The plurality of magnets (6) are positioned on the solenoid coil (4) and are oriented at a pre-defined orientation. The plurality of magnets (6) when placed over the solenoid coil (4) may enable pre-magnetizing of the ferromagnetic strip (5) to provide a bias magnetic field in the pipeline (3). In an embodiment, when alternating current (AC) is supplied to the solenoid coil (4), a circumferential magnetic field is created by the solenoid coil (4) in concurrence with the ferromagnetic strip (5) and the plurality of magnets (6). As shown in FIG. 4, the magnetostriction of the ferromagnetic (5) increase from "zero" to "a". In some embodiments, the alternating current supplied to the solenoid coil (4), a time varying magnetic field is created in a direction parallel to the longitudinal axis (X-X) of the pipeline (3). In this period, the magnetostriction of the ferromagnetic strip (5) varies between "c" and "b" as show in FIG. 4. The magnetostriction increases from "a" to "b" during a first quarter cycle (AB) of the alternating current field. Further, the magnetostriction decreases from "b" to "a" during a second quarter (BC) of the alternating current field. The magnetostriction of the ferromagnetic strip further decreases from "a" to "c"

during a third quarter cycle (CD) and then increase from "c" to "a" in a fourth quarter cycle (DE) of the alternating current field. In an embodiment, the magnetostriction of the ferromagnetic strip (5) changes with a same frequency as that of an excitation frequency of the alternating current field. In an embodiment, the excitation of the ferromagnetic strip (5) generates vibrations. The vibrations of the ferromagnetic strip (5) generates plurality of wave modes in the pipeline (3) based on the orientation of the plurality of magnets (6). In an embodiment, if the plurality of magnets (6) are oriented at an angle of 45° [as shown in FIG. 6B], the plurality of wave modes thus generated by the said method include longitudinal wave mode, flexural wave mode and torsional wave mode [as shown in Table-1]. In some embodiments, if the plurality of magnets (6) are oriented at an angle ranging from 30° to 60° excluding 45°, the plurality of wave modes generated may include at least one of torsional wave mode in combination with the flexural wave mode and longitudinal wave mode in combination with the flexural wave mode [as shown in Table-1]. The said plurality of wave modes generated by the above described method propagate in the pipeline (3), the generated plurality of wave modes are reflected to the source of generation.

Figure 5:
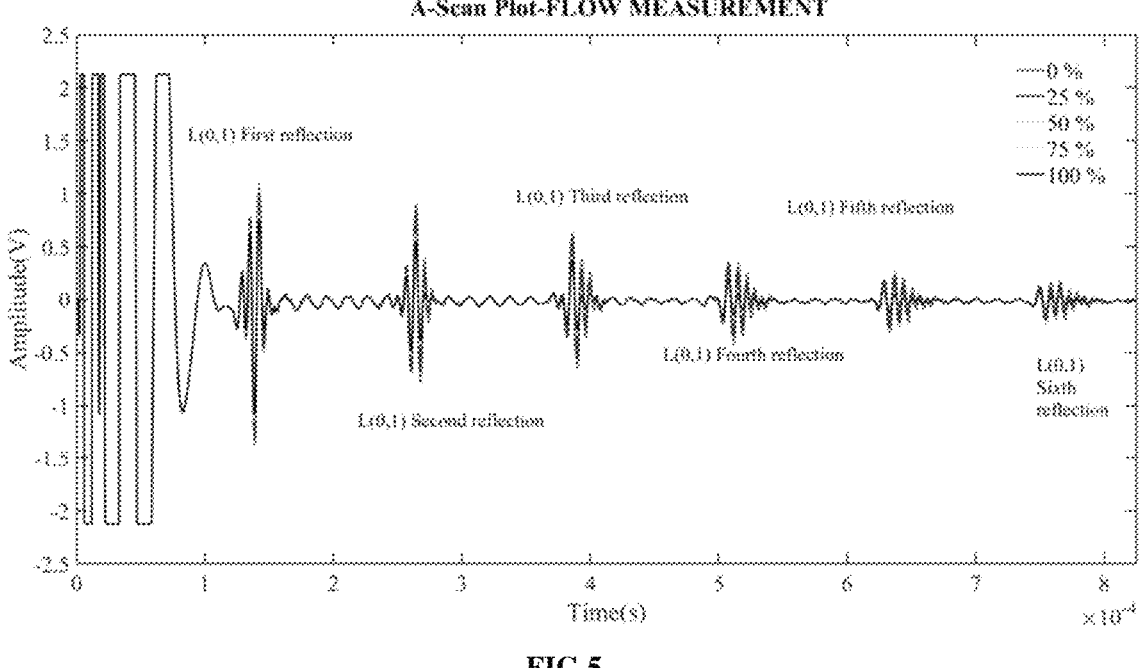
FIG. 5 illustrates an exemplary graph of reflected wave signals during measurement of fluid flow, in accordance with the embodiment of the present disclosure.

As shown at block 103, the processing unit (1) receives a plurality of reflected wave signals corresponding to each of the plurality of wave modes. The plurality of wave signals is then displayed on the oscilloscope (2). Further as depicted in block 104, the plurality of wave signals reflected are compared with a pre-defined wave signals which may be stored in the memory unit associated with the processing unit (1). The plurality of reflected wave signals may be compared with the pre-defined wave signals in the oscilloscope (2) which may display an overlapped amplitude-time curve of the pre-defined wave signals and the plurality of reflected wave signals. Further, the oscilloscope (2) associated with the processing unit may be configured to determine the TOF data and the amplitude ratio of the plurality of reflected wave signals. The said TOF data and the amplitude ratio of the plurality of wave signals may be used by the processing unit (1) to determine the physical properties including corrosion and sediment deposition. In an embodiment, the processing unit may be programmed with pre-defined equations to calculate the physical properties such as density, viscosity, flow measurement [as shown in FIG. 5) etc. based on the TOF data and the amplitude ratio that may be determined from the plurality of reflected wave signals. FIG. 5 depicts the plurality of wave signals corresponding to different flow measurements in the pipeline (3).

In an embodiment, the system (10) may be configured to generate plurality of wave modes simultaneously to monitor the flow of fluid through the pipeline (3). The system (10) of the present disclosure ensures timely detection and thus enable timely elimination of the sediment deposits as the flow is continuously monitored. Also, the system (10).

In an embodiment of the disclosure, the processing unit (1) may be a centralized control unit, or a dedicated control unit associated with the system (10). The control unit may be implemented by any computing systems that is utilized to implement the features of the present disclosure. The control unit may be comprised of a processing unit. The processing unit may comprise at least one data processor for executing program components for executing user- or system-generated requests. The processing unit may be a specialized processing unit such as integrated system (bus) controllers, memory management control units, floating point units, graphics processing units, digital signal processing units, etc. The processing unit may be a hardware unit which include a microprocessor, such as AMD Athlon, Duron or Opteron, ARM's application, embedded or secure processors, IBM PowerPC, Intel's Core, Itanium, Xeon, Celeron or other line of processors, etc. The processing unit may be implemented using a mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

In some embodiments, the processing unit may be disposed in communication with one or more memory devices (e.g., RAM, ROM etc.) via a storage interface. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computing system interface (SCSI), etc. The memory drives may further include a drum, magnetic disc drive, magneto-optical drive, optical drive, redundant array of independent discs (RAID), solid-state memory devices, solid-state drives, etc.

It is to be understood that a person of ordinary skill in the art may develop a system of similar configuration without deviating from the scope of the present disclosure. Such modifications and variations may be made without departing from the scope of the present invention. Therefore, it is intended that the present disclosure covers such modifications and variations provided they come within the ambit of the appended claims and their equivalents.

EQUIVALENTS

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding the description may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations,"

without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated in the description.

| Referral numerals: | |
|---|---|
| Description | Reference Number |
| System | 10 |
| Processing unit | 1 |
| Oscilloscope | 2 |
| Pipeline | 3 |
| Solenoid coil | 4 |
| Ferromagnetic strip | 5 |
| Magnets | 6 |
| Flowchart | 101-104 |

The invention claimed is:

1. A system (10) for monitoring flow of fluid through a pipeline (3), the system (10) comprising:
   a ferromagnetic strip (5) mounted on an outer surface of the pipeline (3), at one or more pre-determined locations;
   a solenoid coil (4) wound around the ferromagnetic strip (5) and is connectable to a power source;
   a plurality of magnets (6) positioned over the solenoid coil (4), wherein each of the plurality of magnets (6) are positioned at a pre-defined orientation with respect to a longitudinal axis of the pipeline (3); and
   a processing unit (1) communicatively connected to the solenoid coil (4), wherein the processing unit (1) is configured to:
   generate a plurality of wave modes simultaneously in the pipeline (3) by supplying power to the solenoid coil (4) in concurrence with the plurality of magnets (6) and the ferromagnetic strip (5);
   receive a plurality of wave signals reflected from the pipeline (3) corresponding to the plurality of wave modes; and compare the received wave signals with pre-defined wave signals to monitor the flow of fluid through the pipeline (3), wherein the plurality of wave modes are generated simultaneously and the plurality of wave modes includes a torsional wave mode, a flexural wave mode and a longitudinal wave mode.

2. The system (10) as claimed in claim 1, wherein the power source supplies power through the solenoid coil (4) and the solenoid coil (4) in concurrence with the plurality of magnets (6) and ferromagnetic strip (5) generates plurality of wave modes simultaneously in the pipeline (3).

3. The system (10) as claimed in claim 1, wherein the processing unit (1) is configured to determine physical properties of the fluid including viscosity, density, temperature and flowrate based on the comparison of the received wave signals with pre-defined wave signals.

4. The system (10) as claimed in claim 1, wherein the processing unit is configured to determine corrosion and sediment deposition in the pipeline (3) based on the comparison of the received wave signals with pre-defined wave signals.

5. The system (10) as claimed in claim 1, wherein the ferromagnetic strip (5) is made of at least one of iron, cobalt and nickel.

6. The system (10) as claimed in claim 1, wherein the solenoid coil (4) is made of copper.

7. The system (10) as claimed in claim 1, wherein the pre-defined orientation of the plurality of magnets (6) with respect to the longitudinal axis (X-X) of the pipeline (3) ranges from 30° to 60°.

8. The system as claimed in claim 7, wherein the torsional wave mode, the flexural wave mode and the longitudinal wave mode are generated by orienting the plurality of magnets (6) at 45° with respect to the longitudinal axis of the pipeline (3).

9. The system as claimed in claim 7, wherein at least one of the longitudinal wave mode along with the flexural wave mode and the torsional wave mode along with the flexural wave mode is generated at the pre-defined orientation between 30° to 60° excluding 45°.

10. The system (10) as claimed in claim 1 comprises an oscilloscope (2) configured to display the plurality of received of wave signals and the pre-defined wave signals.

11. The system (10) as claimed in claim 10, wherein the oscilloscope (2) determines time of flight data (TOF) and an amplitude ratio of the plurality of received wave signals with respect to the pre-defined wave signals.

12. The system as claimed in claim 11, wherein the processing unit (1) determines the physical properties of the fluid within the pipeline (3) based on the time of flight data and the amplitude ratio.

13. A method for monitoring flow of fluid through a pipeline (3), the method (10) comprising:
   positioning a plurality of magnets (6) on a solenoid coil (4) wound on a ferromagnetic strip (5) and orienting the plurality of magnets at a pre-defined orientation with respect to a longitudinal axis of the pipeline (3);
   generating, by a processing unit (1), a plurality of wave modes simultaneously in the pipeline (3) by supplying power to the solenoid coil (4) in concurrence with the plurality of magnets (6) and the ferromagnetic strip (5); and
   receiving, by the processing unit (1), a plurality of wave signals reflected from the pipeline (3) corresponding to the plurality of wave modes; and
   comparing, by the processing unit (1), the received wave signals with pre-defined wave signals to monitor the flow of fluid through the pipeline (3), wherein the plurality of wave modes are generated simultaneously, and the plurality of wave modes includes a torsional wave mode, a flexural wave mode and a longitudinal wave mode.

14. The method as claimed in claim 13, wherein the pre-defined orientation of the plurality of magnets (6) with respect to the longitudinal axis (X-X) of the pipeline (3) ranges from 30° to 60°.

15. The method as claimed in claim 14, wherein the torsional wave mode, the flexural wave mode and the longitudinal wave mode are generated by orienting the plurality of magnets (6) at 45° orientation of the magnet with respect to the longitudinal axis of the pipeline (3).

16. The method as claimed in claim 14, wherein at least one of the longitudinal wave mode along with the flexural wave mode and the torsional wave mode along with the flexural wave mode is generated at the pre-defined orientation between 30° to 60° excluding 45°.

17. The method as claimed in claim 13 comprises displaying, by an oscilloscope (2), the plurality of received of wave signals and the pre-defined wave signals.

18. The method as claimed in claim 17 comprises determining, by the oscilloscope (2), time of flight data (TOF) and an amplitude ratio of the plurality of received wave signals with respect to the pre-defined wave signals.

19. The method as claimed in claim 18 comprises determining, by the processing unit (1), the physical properties of the fluid within the pipeline (3) based on the time of flight data and the amplitude ratio.

20. The method as claimed in claim 18 comprises detection of deposition of at least one of a wax coating and sediment deposition within the pipeline (3) and an outer surface of the pipeline (3) based on the amplitude ratio.

\* \* \* \* \*